INVENTOR
RICHARD G. DEVANEY

United States Patent Office 3,469,012
Patented Sept. 23, 1969

3,469,012
PROCESS FOR SUPPLYING PRECISELY CONTROLLED SUPPLEMENTAL HEATING TO POLYMER MELTS
Richard G. Devaney, Kingsport, Tenn., assignor to Eastman Kodak Company, Rochester, N.Y., a corporation of New Jersey
Filed Nov. 20, 1967, Ser. No. 684,386
Int. Cl. H05b 3/60
U.S. Cl. 13—23                                     6 Claims

ABSTRACT OF THE DISCLOSURE

A direct electrical resistance method of raising the temperature of a polymer melt to a level at which any "high melting particles" contained therein may be liquefied by passing the melt through a plurality of electrodes having a charge thereon of sufficient magnitude to cause a substantial current to flow in the melt thereby raising the temperature of the same.

---

Figure 1:
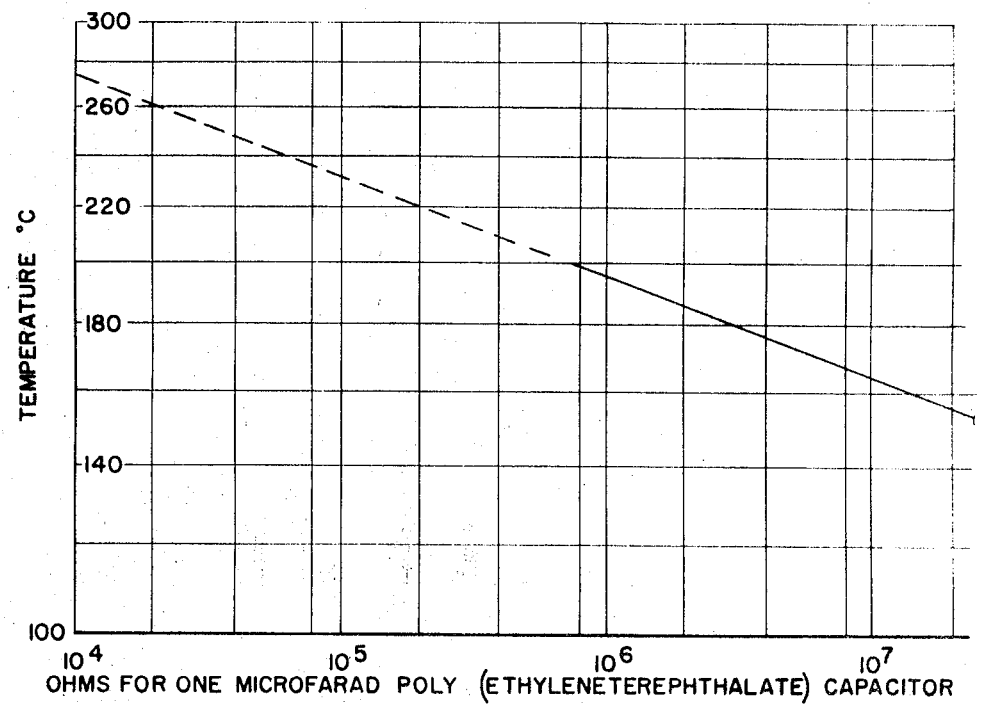

This invention relates to a process for supplying precisely controlled supplemental heating to a polymer melt.

The manufacture of various articles from thermoplastic material often requires the conversion, from a solid to a pure liquid state, of a mass of polymer particles. Ideally, the mass would have a single sharp melting point and the conversion could be accomplished by simply raising the temperature of the mass to that point, at which time all portions of the mass would become simultaneously liquefied. Practically, however, because of the normal presence of structural imperfections in the polymer and particularly because of heat losses incurred as a result of imperfect thermal conductivity between the various heat exchanging media, a wide spectrum of melting points can be encountered. As a consequence, some portions of the polymer mass are liquefied at an earlier stage in the heating process than are neighboring portions, thereby producing a "quasi" melt, in that the melt is not a pure liquid due to the presence of solid particles. Basically, these solid particles, commonly referred to as "high melting particles," are of two different types: one type is that comprised of pure polymer which, due to the thermal insulating properties of the polymer, was simply too remote from the heating mechanism to attain the melting temperature. Obviously, "high melting particles" is actually a misnomer for this type since its melting point is identical to that of the pure polymer. Nevertheless, it has the characteristics of a "high melting particle" in that more heat must be applied to the "quasi" melt to render it a liquid, and therefore it must be treated accordingly. Another type of "high melting particle" is that comprised of structural imperfections or impurities. In this case, the temperature required to produce melting *is* higher than the melting point of the pure polymer. Whether the solid particles are comprised of pure polymer or impurities, or a combination of both, to rid the melt of these particles, without producing a degradation in melt quality, has also been of great concern to the artisans.

It is well known that excessive and/or prolonged heating will cause molecular breakdown or dissociation in the polymer mass and therefore will be detrimental to polymer quality; i.e., polymer purity is a function of the time integral of temperature exposure. It is therefore desirable, in attempting to liquefy the "high melting particles" contained in the melt, to add supplemental heating as rapidly as possible without subjecting any portion of the melt to a temperature substantially in excess of the theoretical melting point.

Heretofore a variety of heating techniques has been employed in an effort to provide a solution to the above identified problem. Mechanical equivalence heating (i.e., heating by performing mechanical work on the polymer) and "jacket" heating (i.e., heating by subjection to a plurality of high temperature metal jackets which, in turn, are maintained at a high temperature by electrical resistance heaters, gas, flame, etc.) are two of the more conventional heating processes. Although these conventional methods are considered reasonably economical and efficient, they suffer a major disadvantage in that both methods are limited by the relatively slow process of diffusion by external surface contact. Thus, in order to heat the entire mass rapidly, it is necessary to maintain certain portions of the mass (those portions in close proximity to the heating mechanism) at temperatures substantially in excess of the theoretical melting point. This necessity to overheat introduces large thermal gradients in the mass and eventually leads to dissociation and general degradation in quality.

Dielectric heating, another conventional heating technique, inherently overcomes this major disadvantage since the heating is accomplished internally by means of passing the mass through a high frequency electric field. But, due to economic considerations, dielectric heating has enjoyed little commercial use.

It is the primary object of this invention to overcome the shortcomings of conventional supplemental heating techniques by providing a unique electrical heating method whereby the temperature of a polymer melt can be increased to a level at which "high melting particles" contained therein may be liquefied and at a rate at which the melt suffers no lasting degradation in quality.

Another object of the invention is to provide a rapid, efficient and economical method for electrically heating a polymer melt.

A further object of this invention is to provide a method for raising the temperatures of a polymer an adjustable incremental amount and for precisely controlling the incremental heating of the melt.

Figure 2:
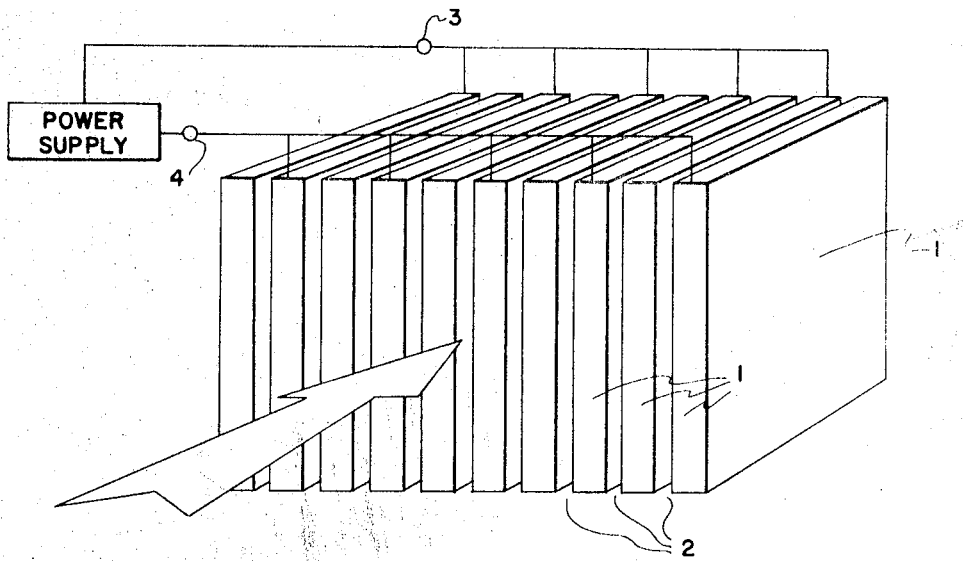

Other and further objects, advantages and features of the invention will be apparent to those skilled in the art from the ensuing description when considered in connection with the accompanying drawings wherein:

FIGURE 1 is a graph illustrating the manner in which the resistivity of poly(ethyleneterephthalate) varies as a function of temperature, and FIGURE 2 is a perspective view of a direct resistance type heater suitable for use in accordance with a preferred embodiment of this invention.

Direct resistance heating is a method of heating in which semiconductors and conductors are used almost exclusively. By this method, heat is generated by causing a current to flow through a material, the degree of heating for a given applied voltage being dependent upon the electrical resistivity of the material. Major advantages of this electric type of heating, compared with mechanical methods of heating, are that (1) heating is accomplished internally, thereby eliminating the necessary establishment of thermal gradients, aforedescribed, and (2) heating may be accomplished extremely rapidly, depending upon the resistivity of the material to be heated. In addition direct resistance heating is superior with respect to all other methods, including other types of electric heating (e.g., dielectric and induction heating) due to its inherent 100% efficiency in converting electric energy into heat; this efficiency, combined with the fact that high frequency oscillators and other costly supplementary apparatus are unnecessary in its application (direct current or conventional 60 cycle alternating current voltage sources being perfectly adequate), make direct resistance heating more desirable from an economical viewpoint. The major disadvantage of direct resistance heating is, of course, its limitation to specific materials, namely those in which a substantial current can be made to flow without causing arcing or molecular breakdown of the material. Because of this limitation this type of heating has never been considered as a practical means of heating a dielectric material (e.g., polymers), for, in order to create sufficient current flow, thereby causing an increase in temperature, a prohibitive voltage must be applied to the electrodes, between which the dielectric would be situated. In other words, the resistivity of a dielectric is so great (at normal use temperatures) that breakdown or arcing will occur prior to substantial current flow.

Now, in accordance with the present invention it has been discovered that polymers, in general, do not behave as good dielectrics (as they are commonly known to be) when heated to temperatures approaching their melting points and above. That is to say, as the temperature of a polymer is raised beyond a certain level, that level being determined by the molecular structure of the particular polymer, the electrical resistivity decreases to such an extent that the polymer readily (i.e., in comparison to its conductivity at room temperature) conducts electric current. In fact, the resistivity of a high temperature polymer has been found to be so low that it falls within the resistivity range of semi-conductors. Thus, it has been discovered that direct resistance heating is adaptable as a method for supplying supplemental heating to polymers once the resistivity has been reduced to such a level as to reduce the chance of dielectric breakdown.

FIGURE 1 shows the extrapolated resistance for a one-microfarad capacitor wound from a typical polymer, poly-(ethylene terephthalate), the dielectric. From this curve it can be seen that this particular polymer, at 275° C., will have a resistance of 10,000 ohms if confined to an electrode arrangement (e.g., a plurality of parallel plates) such that the total electrostatic capacity is one microfarad. At this resistance it can be readily appreciated that electrical resistance heating becomes practical as a means of further heating the polymer because it is then possible to cause a current flow, by means of applying a voltage across the polymer having a value less than that which will produce arcing, but of sufficient intensity to create rapid heating. Verifications of this statement can be seen from the following analysis. If 6,000 volts D.C. is applied across the 10,000 ohms previously mentioned, a current of 600 milliamperes will flow, as per Ohm's law. Since power is defined as the product of current and voltage, and since the inherent efficiency of converting electric energy into heat by resistance heating is 100%, 3,600 watts of heat will be generated in the volume defined by the one microfarad capacitance. Thus, if the electrodes of a resistance heater are arranged in a manner as illustrated in FIGURE 2, the electrodes 1 having a spacing 2 between each other so as to produce one microfarad of capacitance between the terminals 3 and 4 when a polymer melt having a temperature of 275° C. is passed between the electrodes, and a voltage of 6,000 volts D.C. is applied across the terminals 3 and 4, then 3,600 watts of heat or approximately 12,350 B.t.u. per hour, will be generated in the melt. Incremental control of the heating can be accomplished by varying the rate of flow of the melt (throughput) between the electrodes. For example, if an incremental temperature increase of 25° C. (45° F.) is desired, then it can be shown from the equation $W = H/SpH \times \Delta T$, wherein W equals throughput in lb./hr. (the unknown in this instance), H is the heating rate in B.t.u./hr. (12,350), SpH is the specific heat of the polymer (0.5 B.t.u./lb. °F. estimated) and $\Delta T$ is the desired temperature increase (45° F.). Thus:

$$W = \frac{12,350}{0.5 \times 45} = 549 \text{ lb./hr.}$$

Similarly the dwell time in the heater can be computed by simply dividing the throughput by the active volume of the heater or the overall volume between the electrodes.

It should be noted that the heating arrangement described above can be operated at least as effectively by applying a low frequency voltage source (e.g., 60 cycle A.C.) across the terminals 3 and 4 in the place of the aforesaid D.C. source. In such an arrangement an additional heating factor must be considered in computing throughput and dwell time. This factor is the heat generated by molecular agitation (the dielectric heating effect) due to the varying electric field. The amount of dielectric heat generated under these circumstances, while considerably less than half the total, is appreciable. The exact amount can be calculated from the expression:

$$P = 0.56 \, f \epsilon'' E^2$$

where P is the heat produced in watts/cm.$^3$ (the unknown in this instance), 0.56 is the configurational constant, $f$ is the frequency in megacycles ($60 \times 10^{-6}$), $\epsilon''$ is the dielectric loss factor (the product of the dielectric constant and dissipation factor, estimated at 0.30), and E is the field strength in kilovolts/cm. (472 for 6,000 volts across 0.005″). Thus:

$$P = 0.56(60 \times 10^{-6})(0.30)(472^2) = 2.2 \text{ watts/cm.}^3$$

The advantages of combining direct current and alternating current sources should be apparent. Having a precisely controllable A.C. signal superimposed on the D.C. component provides for the possibility of vernier control of heating.

The process of this invention is best illustrated by means of the following example. This example is intended merely for illustration purposes and the invention is not to be limited in scope nor the manner in which it can be practiced by the specific description of this example.

EXAMPLE 1

A poly(ethylene terephthalate) melt having an initial temperature of 275° C. was further heated by passing it through a heating cell comprising a plurality of parallel and equally spaced plate electrodes, each electrode being electrically charged with respect to its neighboring electrodes by means of a 60 cycle, 6,000 volt source of potential. The heating cell was constructed from 820 plates each having a thickness of 0.020 inch and spaced from one another a distance of 0.005 inch. The dimensions of each plate were 18 inches by 0.50 inch. Thus, the gross active volume of the heater was 18 inches by 20.50 inches by 0.50 inch or 185 cubic inches and the volume available to the polymer melt was 37 cubic inches. The heater was installed in line with a conventional extruder such that the extruder fed the molten polymer to the heater, from which the polymer continued to the extrusion die. It was found that a dwell time between the electrodes of 8.5 seconds, which is equivalent to a throughput of approximately 750 lbs./hr., resulted in an increase in melt temperature of approximately 25° C. The heat generated by current flow (i.e., IR$^2$ heating) was computed to be approximately 3,550 watts and the heat generated from molecular agitation due to the 60 cycle field was computed to be approximately 1,350 watts. Thus, the total heat available for raising the temperature of the polymer was approximately 5,000 watts.

It should be obvious to those skilled in the art that the electrode arrangement set forth above is but one example of the type adaptable for use. Other electrode arrangements (e.g., concentric rings, cylinders with axial wires, wire grids, etc.) immediately suggest themselves. Possibly it might be found desirable to heat only a portion of the total melted polymer cross-section. In such a case, the heater would not intercept the entire stream as described above.

Although only one specific example is provided in describing the utility of this invention, it should be apparent to the artisans that all polymers, because of their common physical, chemical, and electrical properties, can be heated by precisely the same process, once the resistivity of the same has been sufficiently lowered. For example, supplemental heating may be added to a melt where the polymer is a polyamide such as nylon 66. Since the dielectric constant of this polymer is approximately 200 times that of poly(ethylene terephthalate) at its melting point, however, a one-microfarad capacitor for molten nylon 66 would be only $\frac{1}{200}$ the size of that required in Example 1 above if all other parameters are kept constant. Thus, only about 4 plates 18" x 0.50" x 0.020" would be required to achieve the desired result rather than 820 plates as in Example 1. Since the resistance of a one-microfarad capacitor of nylon 66 is between 5 and 6 ohms at the melting point of 260° C. as compared to the 10,000 ohms of poly(ethylene terephthalate) at its melting point of 275° C., to achieve the same 600 milliampere current flow would require a voltage of only 3.6 and only about 2.16 watts of heat would be generated. This amount of heat, while seemingly small would be confined to a very small area thus raising the temperature of anything within the area substantially.

From the foregoing, it can be appreciated that this concept of heating a polymer is basic; heretofore, it has been unknown to the art of polymer melting and process. Its major advantage over the existing methods of heating are that (1) a chemically purer polymer melt is attainable due to the absence of thermal degradation; (2) the heating efficiency is optimum; (3) the rate of heating is more rapid than the mechanical methods owing to the fact that the diffusion of heat is obviated; (4) all portions of the melt are heated uniformly and simultaneously due to the fact that heat is generated internally; (5) the incremental heating can be precisely controlled electrically as well as mechanically; and (6) the heating process is generally more economical than other electrical heating techniques since conventional power (D.C. or 60 cycle A.C.) is adaptable for its use.

What I claim is:

1. A process for melting polymeric material for extrusion which comprises the steps of:
   (a) initially heating the polymeric material until appreciable melting occurs and said material exhibits an electrical resistance sufficiently low to permit heating by passing an electrical current therethrough,
   (b) rapidly raising the temperature of said material above the normal melt temperature thereof uniformly throughout a selected volume by passing an electrical current through said selected volume by means of a plurality of substantially equally spaced electrodes interposed across the flow path of said polymeric material, each having a voltage differential with respect to at least one adjacent electrode, thereby insuring complete liquidation of the polymeric material,
   (c) maintaining continuous flow of said polymeric material through said selected volume, and
   (d) returning said polymeric material to a lower temperature before appreciable thermal degradation occurs.

2. A process according to claim 1 in which said electrical current is direct.

3. A process according to claim 1 in which said electrical current is alternating.

4. A process according to claim 1 in which said polymer melt is subjected to the combination of alternating and direct current.

5. A process according to claim 1 in which said electrodes are in the form of plates extending generally parallel to the direction of polymer flow.

6. A process according to claim 1 in which only minute amounts of said polymer are in a solid state when the temperature is carried above the normal melt temperature.

References Cited
UNITED STATES PATENTS

| 2,988,581 | 6/1961 | Van Berkel | 13—23 |
| 3,349,160 | 10/1967 | Rapson | 13—12 |

BERNARD A. GILHEANY, Primary Examiner

H. B. GILSON, Assistant Examiner

U.S. Cl. X.R.

13—12